US009852415B2

(12) United States Patent
Luoma et al.

(10) Patent No.: US 9,852,415 B2
(45) Date of Patent: Dec. 26, 2017

(54) MOBILE APPARATUS WITH TRANSACTION INFORMATION

(71) Applicant: OP-Palvelut Oy, Helsinki (FI)

(72) Inventors: Kristian Luoma, Helsinki (FI); Jussi Juntunen, Helsinki (FI); Tuomas Jomppanen, Helsinki (FI)

(73) Assignee: OP-PALVELUT OY, Helsinki (FI)

( * ) Notice: Subject to any disclaimer, the term of this patent is extended or adjusted under 35 U.S.C. 154(b) by 139 days.

(21) Appl. No.: 14/210,617

(22) Filed: Mar. 14, 2014

(65) Prior Publication Data

US 2014/0279442 A1   Sep. 18, 2014

(30) Foreign Application Priority Data

Mar. 14, 2013   (FI) .................................... 20135248

(51) Int. Cl.
*G06Q 20/32* (2012.01)
*G06Q 40/02* (2012.01)

(52) U.S. Cl.
CPC ................... *G06Q 20/3221* (2013.01)

(58) Field of Classification Search
CPC ........ G06Q 40/00; G06Q 40/02; G06Q 20/00; G06Q 10/00; G06Q 40/12; G06Q 20/32; G06Q 20/341; G06Q 20/227; G06Q 20/3221; G06Q 20/3223; G06Q 30/0215; G06Q 30/0255; H04M 15/83; H04M 15/84; H04M 15/85
USPC .......................................................... 705/39
See application file for complete search history.

(56) References Cited

U.S. PATENT DOCUMENTS

| | | | |
|---|---|---|---|
| 8,639,622 B1* | 1/2014 | Moore et al. | 705/43 |
| 2003/0009402 A1 | 1/2003 | Mullen et al. | |
| 2004/0171405 A1* | 9/2004 | Amano | G06Q 20/341 455/556.2 |
| 2009/0233640 A1* | 9/2009 | Kurihara | G06Q 20/32 455/550.1 |
| 2011/0063234 A1 | 3/2011 | Liu | |
| 2011/0087985 A1* | 4/2011 | Buchanan | G06F 3/04847 715/771 |
| 2012/0130869 A1* | 5/2012 | Shergill | G06Q 40/12 705/30 |
| 2014/0194162 A1* | 7/2014 | Tsudik | G06F 1/1694 455/566 |

(Continued)

FOREIGN PATENT DOCUMENTS

EP   14155748   * 12/2013

OTHER PUBLICATIONS

European Search Report, dated May 14, 2014, from corresponding EP application.

(Continued)

*Primary Examiner* — Clifford Madamba
(74) *Attorney, Agent, or Firm* — Young & Thompson

(57) ABSTRACT

Mobile apparatus with transaction information is disclosed. The mobile apparatus receives, from an electronic service, with the wireless transceiver, a plurality of packets relating to transactions of an account linked with a payment card, transforms the received plurality of packets into transaction information, and displays, with the user interface, the transaction information such that transactions in relation to each other are represented by geometric objects.

6 Claims, 13 Drawing Sheets

(56) References Cited

U.S. PATENT DOCUMENTS

2014/0236789 A1* 8/2014 Caldwell .......................... 705/35

OTHER PUBLICATIONS

Bubble chart [online]. Wikipedia [retrieved on Dec. 17, 2013], [archived on Jun. 5, 2012]. Retrieved from the Internet: <URL:http://web.archive.org/web/20120605034639 /http://en.wikipedia.org/wiki/Bubble_chart>.
Finnish Search Report in corresponding application 20135248 dated Dec. 20, 2013.
Finnish Office Action dated Mar. 26, 2015, from corresponding FL application 20135248.
Christine Chan; "Simply Keep Track of Where Your Money Goes With Next—Expense Tracking"; FinanceNext—Expense Trackingnoidentity gmbh Utilities, Feb. 21, 2013, [retrieved on Mar. 25, 2015], Internet: <URL: https://web.archive.org/web/20130225032428/http://appadvice.com/review/quickadvice-nextexpensetracking>.
May 8, 2017, EP communication issued for related EP application No. 14 155 748.8-1871.

* cited by examiner

MOBILE APPARATUS WITH TRANSACTION INFORMATION

FIELD

The invention relates to a mobile apparatus, and more specifically to a user interface of the mobile apparatus capable of displaying transaction information.

BACKGROUND

The management of personal finances is challenging. In the past, it was relatively easy to visualize the available funds in the wallet. Nowadays, as the payment cards are used, it is not so easy to visualize the available funds and whether they will last up to the next payday. A mere balance of an account will not tell the situation at a glance. Further sophistication is clearly desirable in order to improve the user interface so that the financial information may be conveyed to the user with improved usability (=with improved ease of use and learnability).

BRIEF DESCRIPTION

The present invention seeks to provide an improved mobile apparatus.

According to an aspect of the present invention, there is provided a mobile apparatus comprising a wireless transceiver, a user interface, one or more processors, and one or more memories including computer program code, the one or more memories and the computer program code configured to, with the one or more processors, cause the mobile apparatus at least to: receive, from an electronic service, with the wireless transceiver, a plurality of packets relating to transactions of an account linked with a payment card; transform the received plurality of packets into transaction information; and display, with the user interface, the transaction information such that transactions in relation to each other are represented by geometric objects.

According to an aspect of the present invention, there is provided a non-transitory computer-readable medium comprising computer program code, which computer program code, when executed on the mobile apparatus, causes the mobile apparatus to: receive, from an electronic service, with a wireless transceiver, a plurality of packets relating to transactions of an account linked with a payment card; transform the received plurality of packets into transaction information; and display, with a user interface, the transaction information such that transactions in relation to each other are represented by geometric objects.

The invention may provide at least some of the following advantages: the user interface may be more efficient to use, it may take less time to accomplish a particular task with the user interface, the user interface may be easier to learn, a specific user interface operation may be learned by observing the user interface, the user interface may be more satisfying to use as its implementation is both visual and intuitive, the memorability of the user interface logic may be quite good.

LIST OF DRAWINGS

Example embodiments of the present invention are described below, by way of example only, with reference to the accompanying drawings, in which FIG. 1 illustrates an example embodiment of a general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
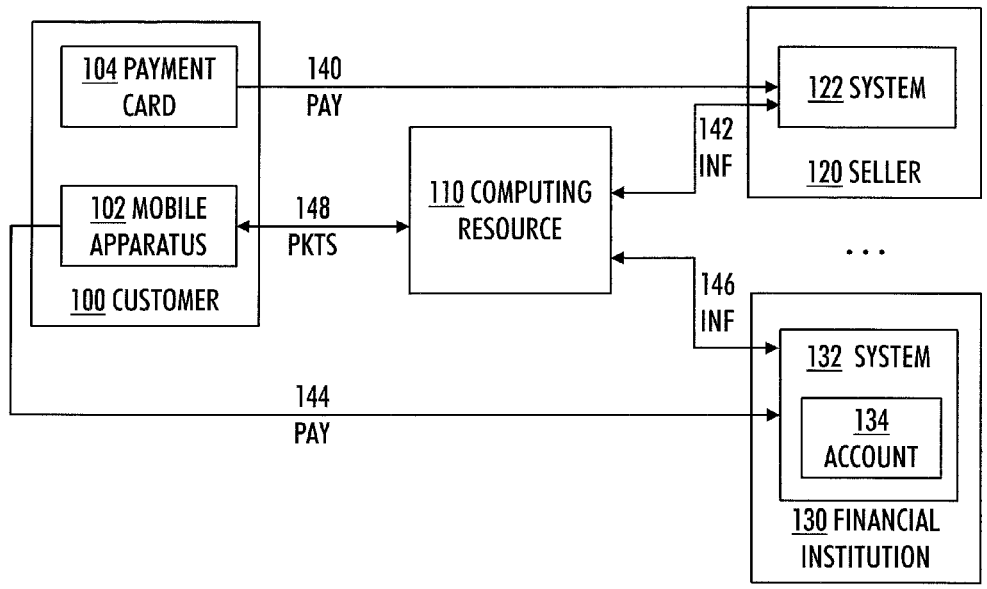

FIG. 1 illustrates an example embodiment of a general operating environment. A customer 100 interacts with at least one seller (=provider of commodity) 120. The customer 100 has in his/her possession at least one payment card 104 and a mobile apparatus 102. Each seller 120 has a system 122 such as a point of sale system. The customer 100 purchases a commodity from the seller 120 and makes payments 140 with his/her payment card 104. A computing resource 110 exchanges information 142 with the system 122 of the seller 120 and also exchanges packets 148 with the mobile apparatus 102. The customer 100 may also make payments 144 from an account 134 associated with the payment card 104 by interacting through the mobile apparatus 102 with a system 132 of a financial institution 130 such as a bank.

The customer 100 may also be known as a client, buyer, purchaser, or consumer. The seller 120 may also be known as a vendor, or supplier, and even a retailer, although the term "retail" highlights the fact that the trade is business-to-consumer type rather than the business-to-business type. The seller 120 may operate in a shop such as a store, market, or shopping mall, for example, but the seller 120 may also operate without a shop, such as in an online environment realizing electronic commerce with electronic transactions and mail order.

A trade between the customer 100 and the seller 120 transfers the ownership of the commodity from the seller 120 to the customer 100, and the seller 120 gets a payment in exchange. The commodity is any marketable item produced to satisfy wants or needs, and the commodity comprises (consumer) goods and services.

The payment card 104 may be used by the cardholder 100 and accepted by the seller 120 to make payments 140 for the trade. In an example embodiment, the payment card 104 may be a credit card or a debit (or bank) card, or any other suitable payment medium, for example. In an example embodiment, the payment card 104 may be implemented as a magnetic stripe card, smart card, or a proximity card, or with any other suitable technology, for example.

In an example embodiment, the system 122 may be a simple point of sale terminal or it may comprise a number of different hardware and software components. The system 122 may implement an electronic cash register, an inventory system, a customer relationship management system etc.

Figure 4:
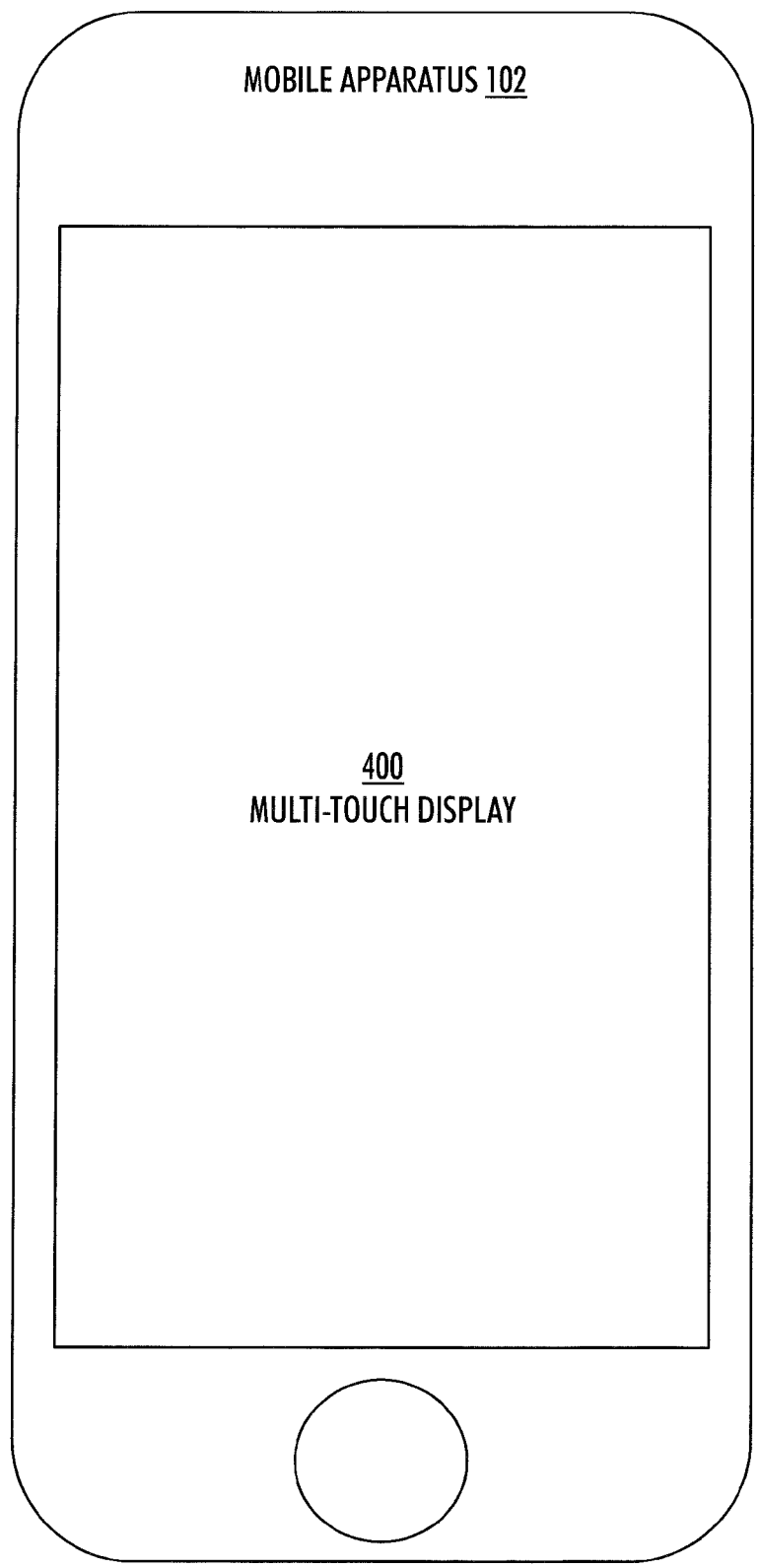

In an example embodiment, the mobile apparatus 102 is a portable electronic communication apparatus. A non-exhaustive list of the types of the mobile apparatus 102 includes: a mobile phone, a smartphone, a tablet computer, a general-purpose mobile computing device. In an example embodiment, the mobile apparatus 102 is a general-purpose off-the-shelf computing device, as opposed to a purpose-build proprietary equipment, whereby research & development costs will be lower as only the special-purpose software (and not the hardware) needs to be designed, implemented and tested. In FIG. 4, an example embodiment of the mobile apparatus 102 is illustrated: the mobile apparatus 102 is a smartphone or a tablet employing a multi-touch display 400. Such devices may employ a suitable operating system such as iOS, Android, or Windows Phone, for example.

In an example embodiment, the computing resource 110 may be implemented as a single server computer or as a cluster of computers. The server 110 is a part of the client-server computing model that acts as distributed application which partitions tasks or workloads between the provider of a resource or service, called server, and the service requester, called client. The server 110 may serve both the mobile apparatus 102 and the systems 122, 132. The server computer 110 is a host that is running one or more server programs which share their resources with clients 102, 122, 132. The client 102, 122, 132 may request a server's content or service function. The client 102, 122, 132 therefore initiates a communication session with the server 110 which awaits incoming requests.

The computing resource 110 may also operate according to the cloud computing model. Naturally, besides these example embodiments of the computing resource 110, other feasible computing architectures may be utilized as well to implement the hardware and software of the computing resource 110. Consequently, besides operating according to the client/server architecture, push technology may be utilized as well. In push technology, the request for a transaction is initiated by the server 110, whereas with the pull technology the request for the information is initiated by the client 102, 122, 132.

The use of the payment card 104 for payments 140 generates transaction information 142. Also the use of the mobile apparatus 102 for payments 144 from the account 134 linked with the payment card 104 generates transaction information 146. Also other transactions directed at the account 134 generate the transaction information.

In an example embodiment, the transactions 142 come to the computing resource 110 directly from the (point of sale) systems 122, or via an intermediary such as a bank or another financial institution 130.

The service provider maintaining the computing resource 110 may be an application service provider, which provides the computer-based service with Internet hosting for the customers 100, sellers 120 and financial institutions 130. In an example embodiment, the service provider 110 is the applicant, OP-Pohjola Group, or some other financial institution 130.

As already explained, the customer 100 makes the payment 140 with his/her payment card 104 to the system 122 of the seller 120. The system 122 may transmit the transaction(s) to a routing/acquiring/issuing bank 130. As the role of the bank is not very important, the complex structure is depicted with a single entity 130, although the situation may in reality be quite complex. The acquiring bank processes the credit or debit card 104 payments, and it acquires credit card payment from the card-issuing banks within an association. The issuing bank offers the (possibly card association branded) payment cards 104 to the consumers 100, and it issues the payment to the acquiring bank on behalf of the consumer 100. Well-known card associations include Visa, MasterCard, American Express, and Diners Club, for example. It is also to be noted that the integration grade between the computing resource 110 and the routing/acquiring/issuing bank 130 may change: every element may be a separate actor, or one or more elements may be combined to a multi-actor element.

The transaction information may be transmitted from the computing resource 110 to the mobile apparatus 102 in a plurality of packets 148. The packet 148 may include control information and the actual payload. The term "packet" also includes the possibility that messages are used, i.e., the data is divided into messages, which, in turn, are transported by the packets 148.

Figure 2:
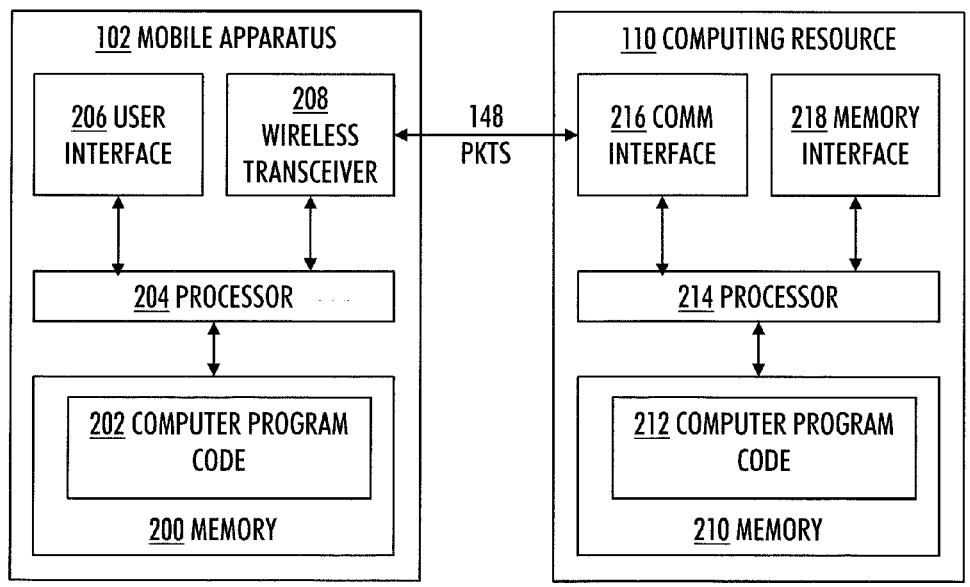
FIG. 2 illustrates example embodiments of a mobile apparatus and a computing resource.

Next, let us study FIG. 2 illustrating example embodiments of the mobile apparatus 102 and the computing resource 110.

The mobile apparatus 102 comprises a wireless transceiver 208, a user interface 206, one or more processors 204, and one or more memories 200 including computer program code 202.

In an example embodiment, the wireless transceiver 208 may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

In an example embodiment, the wireless transceiver 208, while communicating with a mobile phone network, may require a subscriber identity module (SIM), which may be an integrated circuit storing subscriber data, which is network-specific information used to authenticate and identify subscribers on the cellular network. The subscriber identity module may be embedded into a removable SIM card, on a mini-SIM card, for example. Furthermore, the mobile apparatus 102 may include a SIM card reader, for example. Besides being implemented on a SIM card, the subscriber identity module may be implemented with other techniques as well, such as a virtual/embedded SIM.

In an example embodiment, the user interface 206 implements the exchange of graphical, textual and auditory information with the customer 100. The user interface 206 may be realized with various techniques, such as a display, means for producing sound, a keyboard, and/or a keypad, for example. The display may be a liquid crystal display, for example, but it may also be implemented by any appropriate technique, such as with an active-matrix organic light-emitting diode. The display may also incorporate other user interaction means, such as touch input, or haptic feedback, i.e. the display may be a multi-touch display 400. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 206 may comprise other user interface components, for example various means for focusing a cursor (mouse, track ball, arrow keys, touch sensitive area etc.) or elements enabling audio control.

Naturally, the mobile apparatus 102 may include various other parts, such as a battery, a camera, a radio-frequency identifier reader, a positioning receiver, but as they are not needed to further illustrate the example embodiments, they will not be further described.

The computing resource 110 comprises a communication interface 216, a memory interface 218, one or more processors 214, and one or more memories 210 including computer program code 212. In an example embodiment, the computing resource 110 is a computer, such as a single server computer or a cluster of computers, whereby the one or more processors 214 and the one or more memories 210 may be implemented by suitable processors, even in parallel or multicore embodiments, for example.

The communication interface 216 enables communication with other parts of the system, such as the communication 148 with the mobile apparatus 102, and the communication 142, 146 with the systems 122, 132. The communication interface 216 may be coupled with a communication network. The communication network may comprise a wired network, such as the Internet, and also a wireless system capable of communicating with the wireless transceiver 208 of the mobile apparatus 102. Consequently, the communication interface 216 utilizes either a wired network interface or a radio transceiver.

The memory interface 218 enables storage of data into a memory, and it may also comprise a database interface to a database. The memory/database coupled to the memory interface 218 may reside in the computing resource 110, or in another resource.

In an example embodiment, the term 'processor' 204, 214 refers to a physical device that is capable of processing data in a computer or other digital electronic device. Depending on the processing power needed, the mobile apparatus 102 and the computing resource 110 may each comprise several processors 204, 214 such as parallel processors or one or more multicore processors. A non-exhaustive list of implementation techniques for the processor 204, 214 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 200, 210 refers to a physical device that is capable of storing the computer program code 202, 212 and data on a temporary or permanent basis for use in a computer or other digital electronic device. In an example embodiment, the term 'memory' refers to working memory (also known as primary storage, main memory or internal storage) directly accessible to the processor 204, 214. In an example embodiment, the working memory may be implemented as a random-access memory (RAM), such as a dynamic RAM, DRAM.

Figure 3:
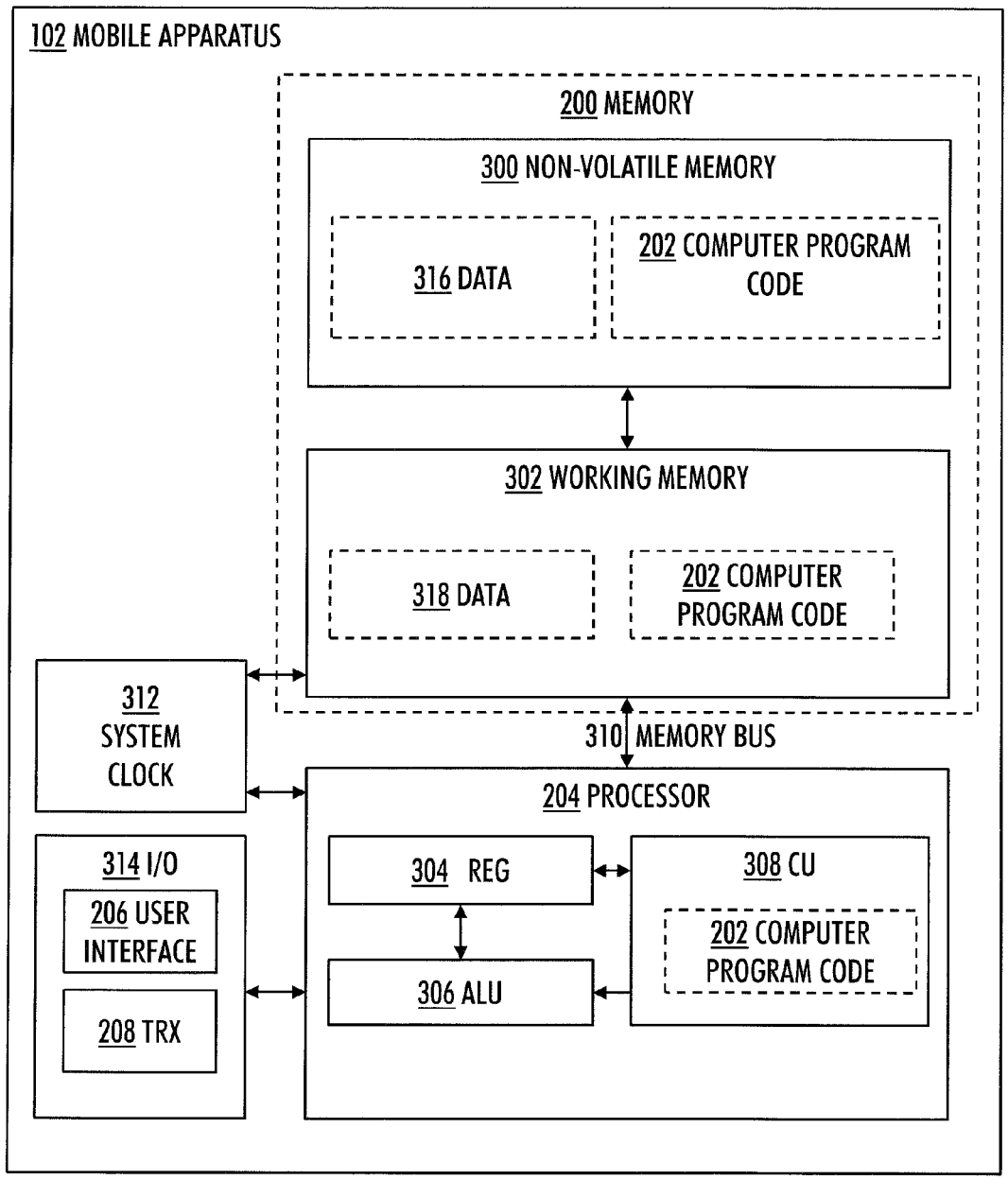
FIGS. 3 and 4 illustrate example embodiments of the mobile apparatus.

Let us next study FIG. 3 illustrating an example embodiment of the mobile apparatus 102. The mobile apparatus 102 may include an electronic digital computer, which may comprise a non-volatile memory 300 and a working memory 302 as the memory 200, the processor 204, a system clock 312 and an input/output 314 including the user interface 206 and the wireless transceiver 208. Naturally, the computer may comprise a number of other peripheral devices, not illustrated here for the sake of clarity. Also, the architecture of FIG. 3 is just one example embodiment as other feasible computing architectures may be utilized as well to implement the hardware and software of the mobile apparatus 102. It is also to be noted that the architecture of FIG. 3 may be applied as well, changing those things which need to be changed, to the implementation of the computing resource 110 as a single computer or a cluster of computers.

In an example embodiment, the system clock 312 constantly generates a stream of electrical pulses, which cause the various transferring operations within the computer to take place in an orderly manner and with specific timing.

In an example embodiment, the processor 204 may be implemented as a microprocessor implementing functions of a central processing unit (CPU) on an integrated circuit. The CPU 204 is a logic machine executing the computer program code 202. The computer program code 202 may be coded as a computer program using a programming language, which may be a high-level programming language, such as C, C++, or Java, or a low-level programming language, such as a machine language, or an assembler. There are many ways to structure the computer program code 202. In an example embodiment, the operations of the computer program code 202 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 202 for performing a wide variety of standard operations.

The CPU 204 may comprise a set of registers 304, an arithmetic logic unit (ALU) 306, and a control unit (CU) 308. The control unit 308 is controlled by the computer program code 202 transferred to the CPU 204 from the working memory 302. The working memory 302 is directly or indirectly connected to the CPU 204 via a memory bus 310 including two buses: an address bus and a data bus. The CPU 204 sends a memory address indicating the desired location of data 318 or computer program code 202 through the address bus, whereupon the CPU 204 reads or writes the data itself from/to the working memory 302 using the data bus.

The control unit 308 may contain a number of microinstructions for basic operations. The implementation of the microinstructions may vary, depending on the CPU design.

The microprocessor 204 may also have an operating system (such as a general-purpose operating system), which may provide the computer program code 202 with system services. During running of the computer program code 202, the computer program code 202 or a part of it are transferred via the memory bus 310 from the working memory 302 into the control unit 308, wherein usually a portion of the computer program code 202 resides and controls the operation.

In an example embodiment, the non-volatile memory 300 retains the stored information even when not powered. Examples of non-volatile memory include read-only memory (ROM), flash memory, magnetic computer storage devices such as hard disk drives, and optical discs. As is shown in FIG. 3, the non-volatile memory 300 may store both data 316 and the computer program code 202.

An example embodiment provides a computer-readable medium comprising the computer program code 202. Said computer program code 202, when executed on the mobile apparatus 102, causes the mobile apparatus 102 to perform the operations required to implement the described example embodiments. In an example embodiment, the computer program code 202 may be in source code form, object code form, or in some intermediate form. The computer-readable medium may comprise at least the following: any entity or device capable of carrying computer program code 202 to the mobile apparatus 102, a record medium, a computer memory, a read-only memory, an electrical carrier signal, a telecommunications signal, and a software distribution medium. In some jurisdictions, depending on the legislation and the patent practice, the computer-readable medium may not be the telecommunications signal. In an example embodiment, the computer-readable medium may be a non-transitory computer readable storage medium.

Now that the basic structures of the mobile apparatus 102 and the computing resource 110 have been described, we may proceed in describing the operation of the mobile apparatus 102 in more detail with reference to FIGS. 5, 6, 7, 8, 9, 10, 11, 12 and 13.

In an example embodiment, the one or more memories 200 and the computer program code 202 of the mobile apparatus 102 are configured to, with the one or more processors 204, cause the mobile apparatus 102 to receive, from an electronic service 110, with the wireless transceiver 208, a plurality of packets 148 relating to transactions 140, 144 of the account 134 linked with the payment card 104, transform the received plurality of packets 148 into transaction information, and display, with the user interface 400, the transaction information such that transactions in relation to each other are represented by geometric objects 510, 516, 514.

Figure 5:
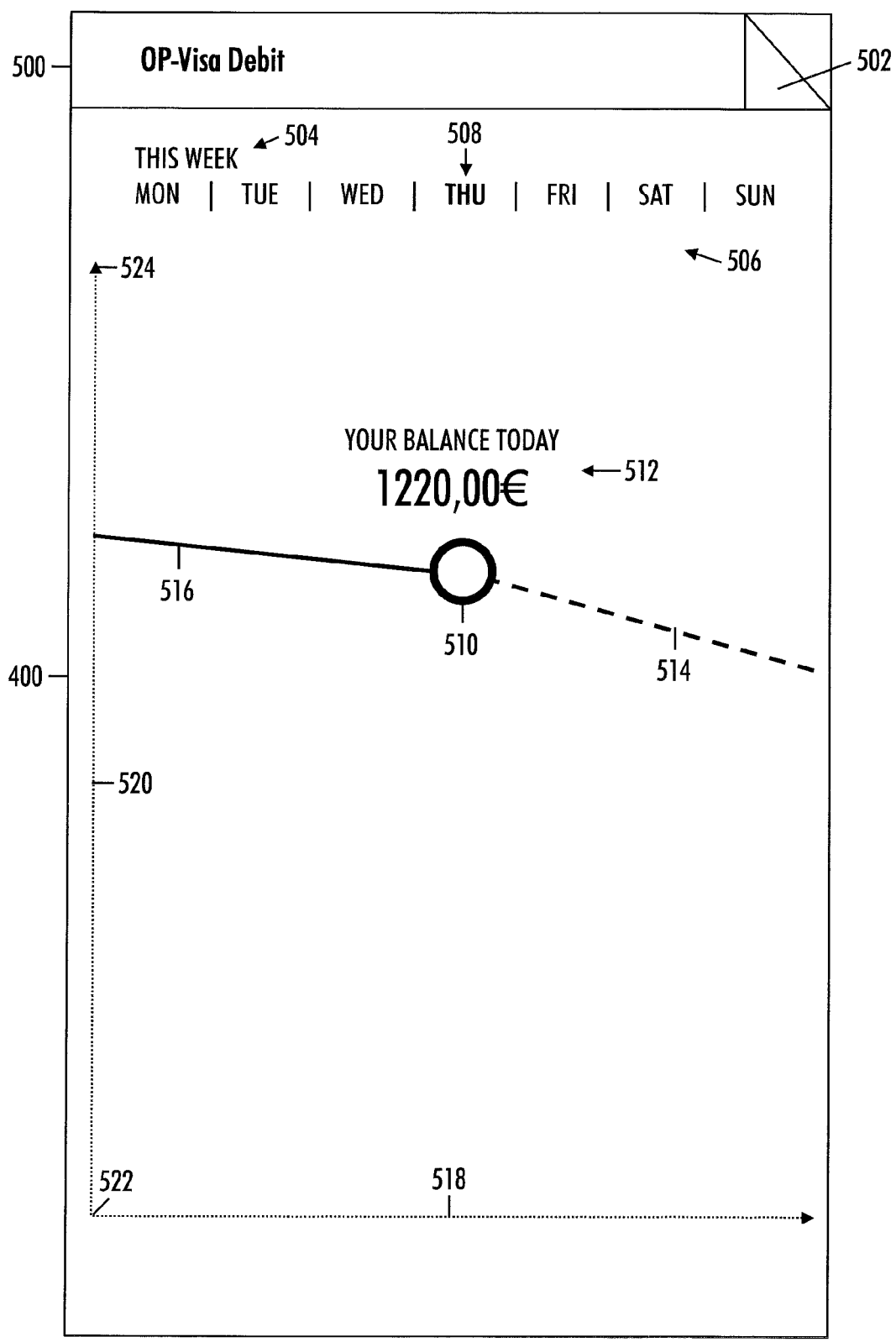
FIGS. 5, 6, 7, 8, 9, 10, 11, 12, 13 and 14 illustrate example embodiments of a user interface of the mobile apparatus.

In an example embodiment, the one or more memories 200 and the computer program code 202 of the mobile apparatus 102 are further configured to, with the one or more processors 204, cause the mobile apparatus 102 further to display the transactions further such that daily balances 512 of the account 134 are displayed for a predetermined time period 506. In FIG. 5, the daily balance 512 of the account 134 is displayed: "Your balance today 1220,00€". The predetermined time period is the present week 504 displayed as a list 506 from Monday to Sunday. Besides the daily balance 512, also the transactions of the account 134 affecting the daily balance 512 may be displayed after tapping the daily balance 512 or the geometric object 510.

In an example embodiment, the one or more memories 200 and the computer program code 202 of the mobile apparatus 102 are further configured to, with the one or more processors 204, cause the mobile apparatus 102 further to display the daily balances 512 in relation to each other such that each daily balance 512 is depicted by a geometric shape 510 at an effective date 508 on a horizontal timeline 518 and at a monetary sum on a vertical account balance line 520.

In an example embodiment, the one or more memories 200 and the computer program code 202 of the mobile apparatus 102 are further configured to, with the one or more processors 204, cause the mobile apparatus 102 further to display the daily balances 512 in relation to each other such that each geometric shape 510 is coupled to the adjacent geometric shapes with geometric curves 516, 514. As illustrated in FIG. 5, the geometric curves 516, 514 may be lines, and the line 516 extending into the past may be a solid line, whereas the line 514 reaching into the future may be a dotted line.

In an example embodiment, the one or more memories 200 and the computer program code 202 of the mobile apparatus 102 are further configured to, with the one or more processors 204, cause the mobile apparatus 102 further to scale the vertical account balance line 520 such that the vertical account balance line ranges from a zero level 522 to a payday level 524. Such a scaling intuitively informs the user of the present daily balance 512 and its relation to the practical minimum and maximum.

In an example embodiment, the one or more memories 200 and the computer program code 202 of the mobile apparatus 102 are further configured to, with the one or more processors 204, cause the mobile apparatus 102 further to scale the horizontal timeline such that the range is the current week 504, plus a predetermined number of weeks into the past, plus another predetermined number of weeks into the future.

As illustrated in FIG. 5, the whole time range may not be displayed in the display 400 at the same time: only the present week 504 is displayed in FIG. 5.

The horizontal timeline may be in a virtual panorama (=wide-angle view in the horizontal direction).

Figure 6:
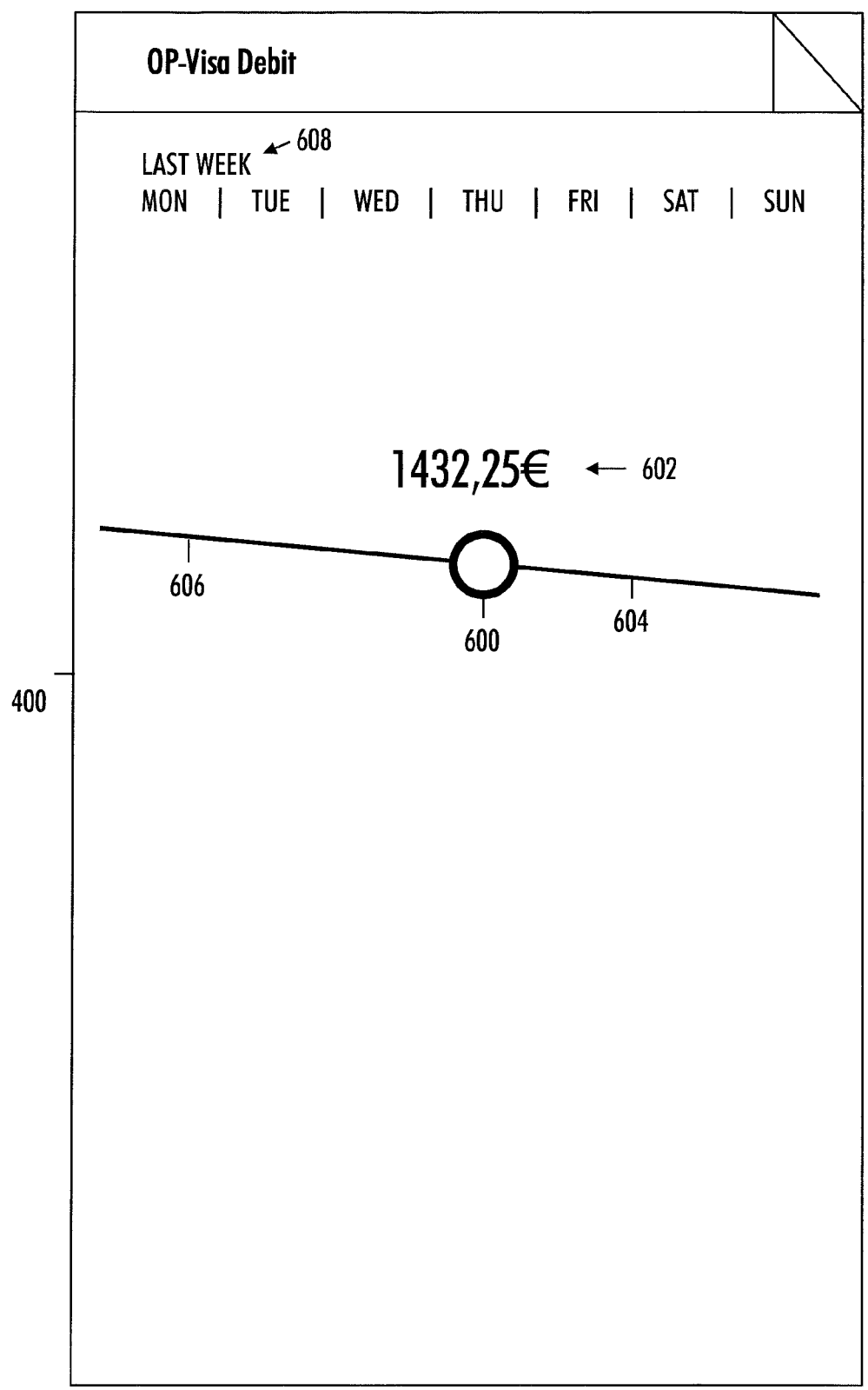

By swiping the display 400 right, the last week 608 illustrated in FIG. 6 is shown: as is shown, the daily account balance 602 depicted with geometric shape 600 has only changed on Thursday. The curves 604 and 606 couple the geometric shape 600 into the forward and backward directions. A further right swipe brings forth the situation two weeks ago 718 illustrated in FIG. 7: the daily account balances 716, 710, 702 have changed on Monday, Friday and Sunday as illustrated also by geometric shapes 714, 708, 700 and curves 712, 706, 704.

Figure 7:
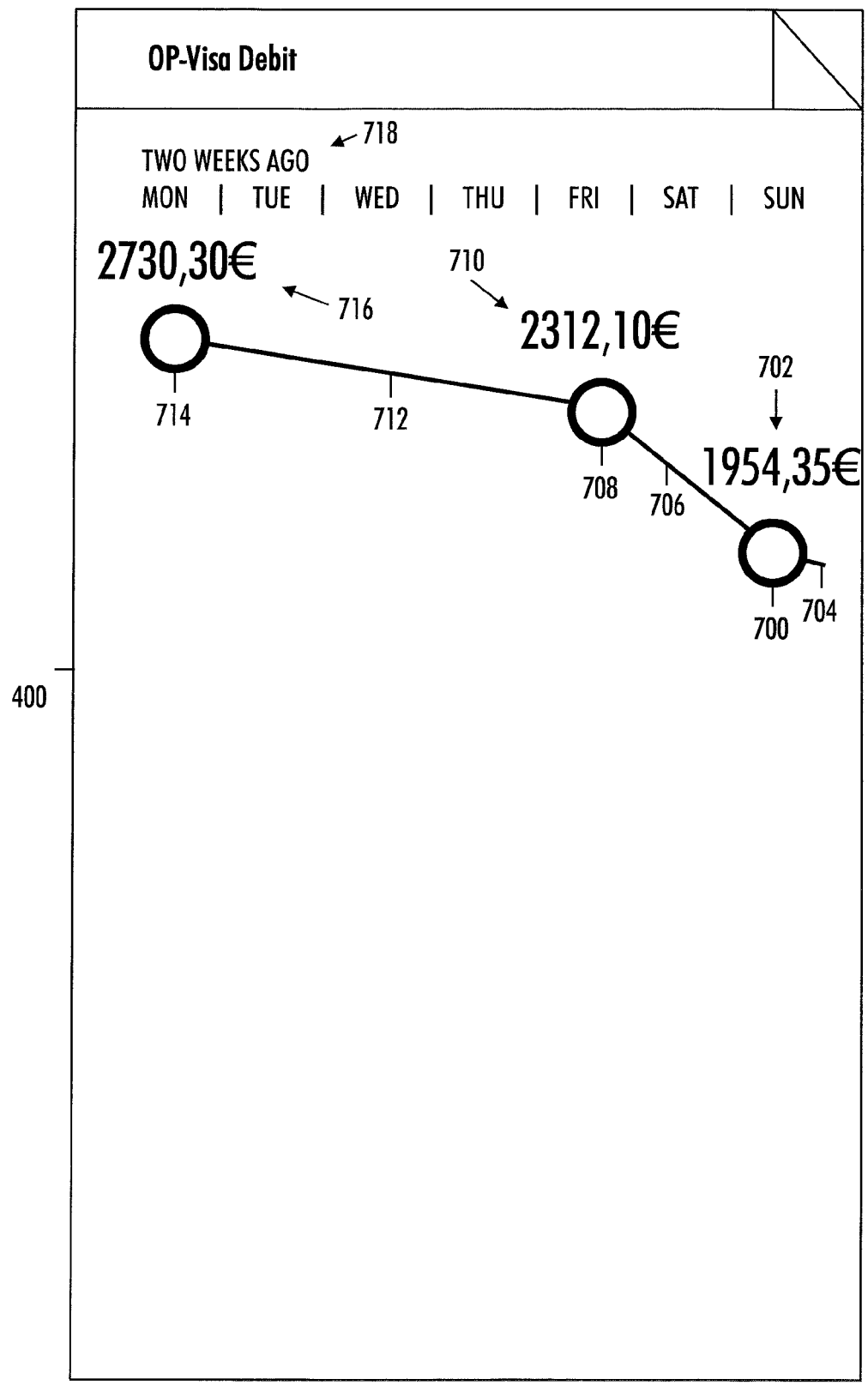
Figure 8:
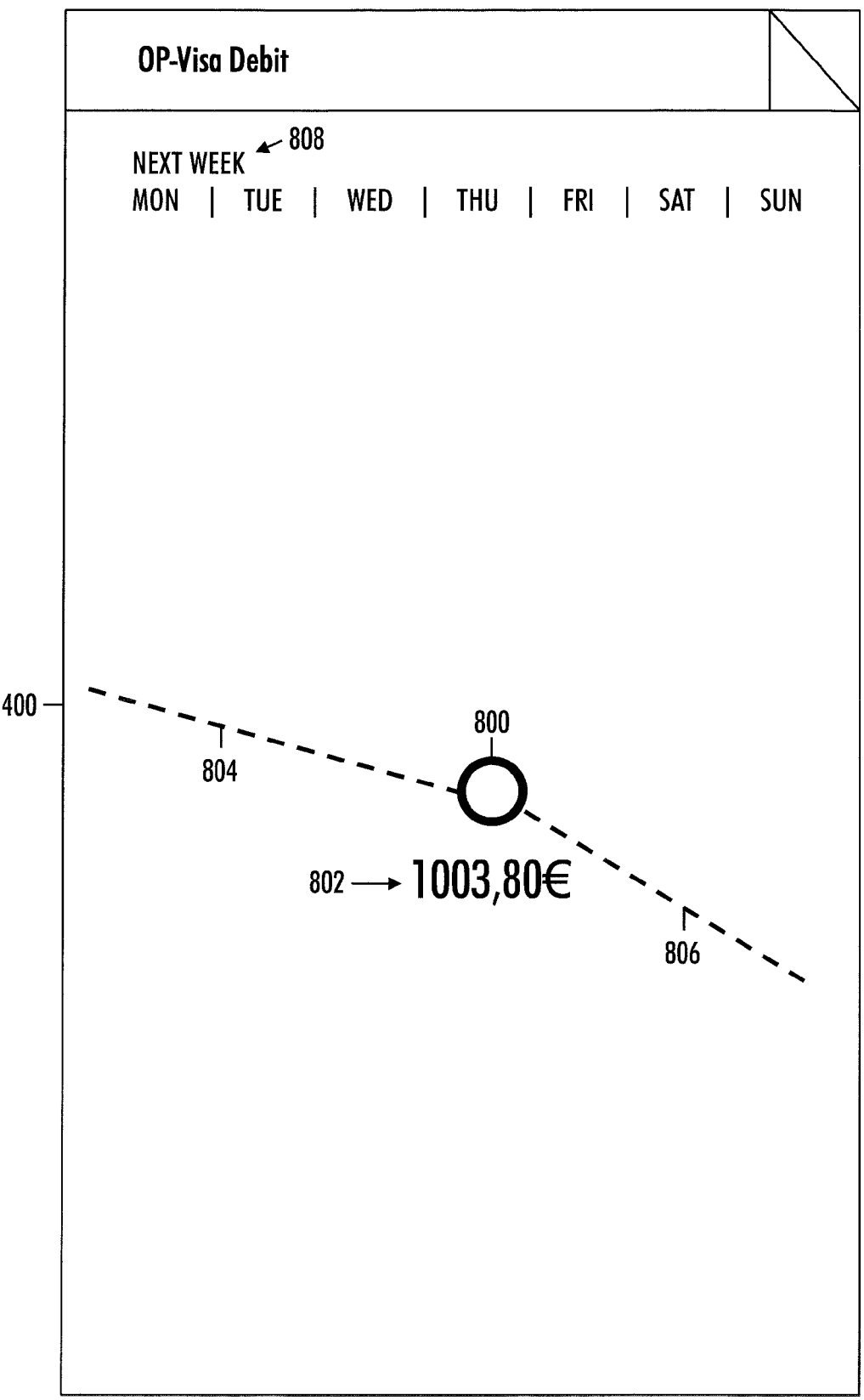

By swiping the display 400 left, the next week 808 illustrated in FIG. 8 is shown: as is shown, the daily account balance 802 depicted with geometric shape 800 will only change on Thursday, by a recurrent payment (rent or the like) for example. The curves 804 and 806 couple the geometric shape 800 into future directions. A further right swipe brings forth the situation in two weeks 908 illustrated in FIG. 9: the daily account balance 902 will change on Wednesday as illustrated also by geometric shapes 900 and curves 904, 906. As is shown, a healthy rise is predicted with the curve 906: the next payday is approaching; the previous payday balance 716 is shown in FIG. 7.

Figure 9:
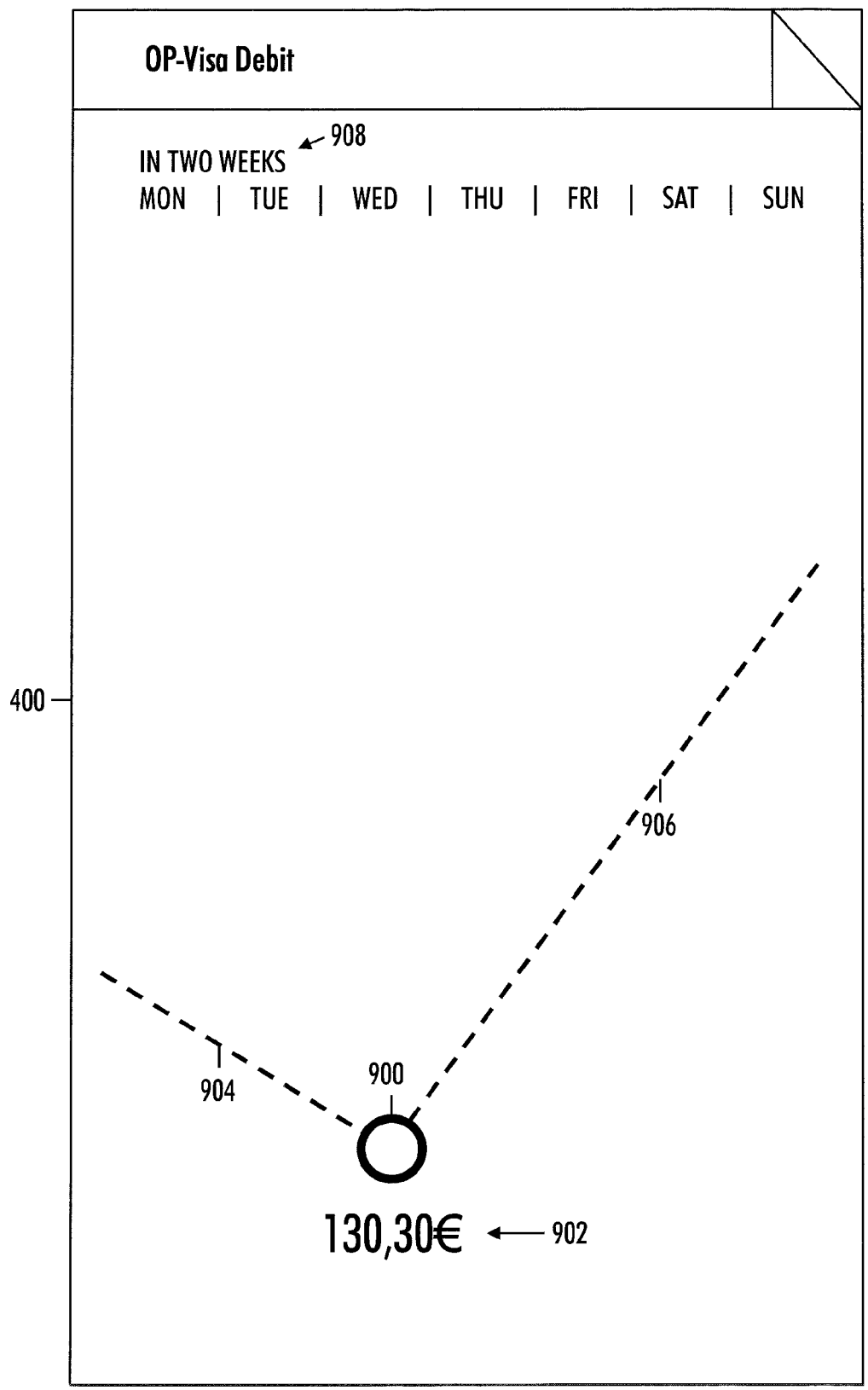

In an example embodiment, the one or more memories 200 and the computer program code 202 of the mobile apparatus 102 are further configured to, with the one or more processors 204, cause the mobile apparatus 102 further to detect from the transaction information daily transactions relating either to cash withdrawals with the payment card 104 or to payments with the payment card 104, calculate an average daily consumption per day by dividing the monetary sum of daily transactions within a predetermined daily effective date range with the number of days in the predetermined daily effective date range, and display a linear forecast for future balance changes of the account 134 by projecting the effect of the average daily consumption into monetary sums on the vertical account balance line 520 in a predetermined future time range on the horizontal timeline 518. The effect of such daily transactions is illustrated in FIGS. 5, 8 and 9: the slope of the curves 514, 804, 806, 904 and 906 into the future is determined with the described processing.

Furthermore, in an example embodiment, the one or more memories 200 and the computer program code 202 of the mobile apparatus 102 are further configured to, with the one or more processors 204, cause the mobile apparatus 102 further to detect from the transaction information future account transactions other than the daily transactions within the predetermined future time range, and project the effect of the average daily consumption into the monetary sums on the vertical account balance line 520 in the predetermined future time range on the horizontal timeline 518 such that the future account transactions are involved in calculating the daily balances of the account. The effect of such future transactions is illustrated with the geometric shapes 800 and 900 of the daily balances 802, 902 in FIGS. 8 and 9.

As is illustrated in FIGS. 5 to 9, in an example embodiment, the one or more memories 200 and the computer program code 202 of the mobile apparatus 102 are further configured to, with the one or more processors 204, cause the mobile apparatus 102 further to display the transactions represented by the geometric objects such that each transaction 512, 602, 716, 710, 702, 802, 902 is represented by a two-dimensional circle 510, 600, 714, 708, 700, 800, 900, and each circle is coupled to the adjacent circles with ascending, descending, or horizontal lines 516, 514, 606, 604, 712, 706, 704, 804, 806, 904, 906. Other geometrical objects may also be feasible such as a three-dimensional sphere instead of the circle.

Figure 12:
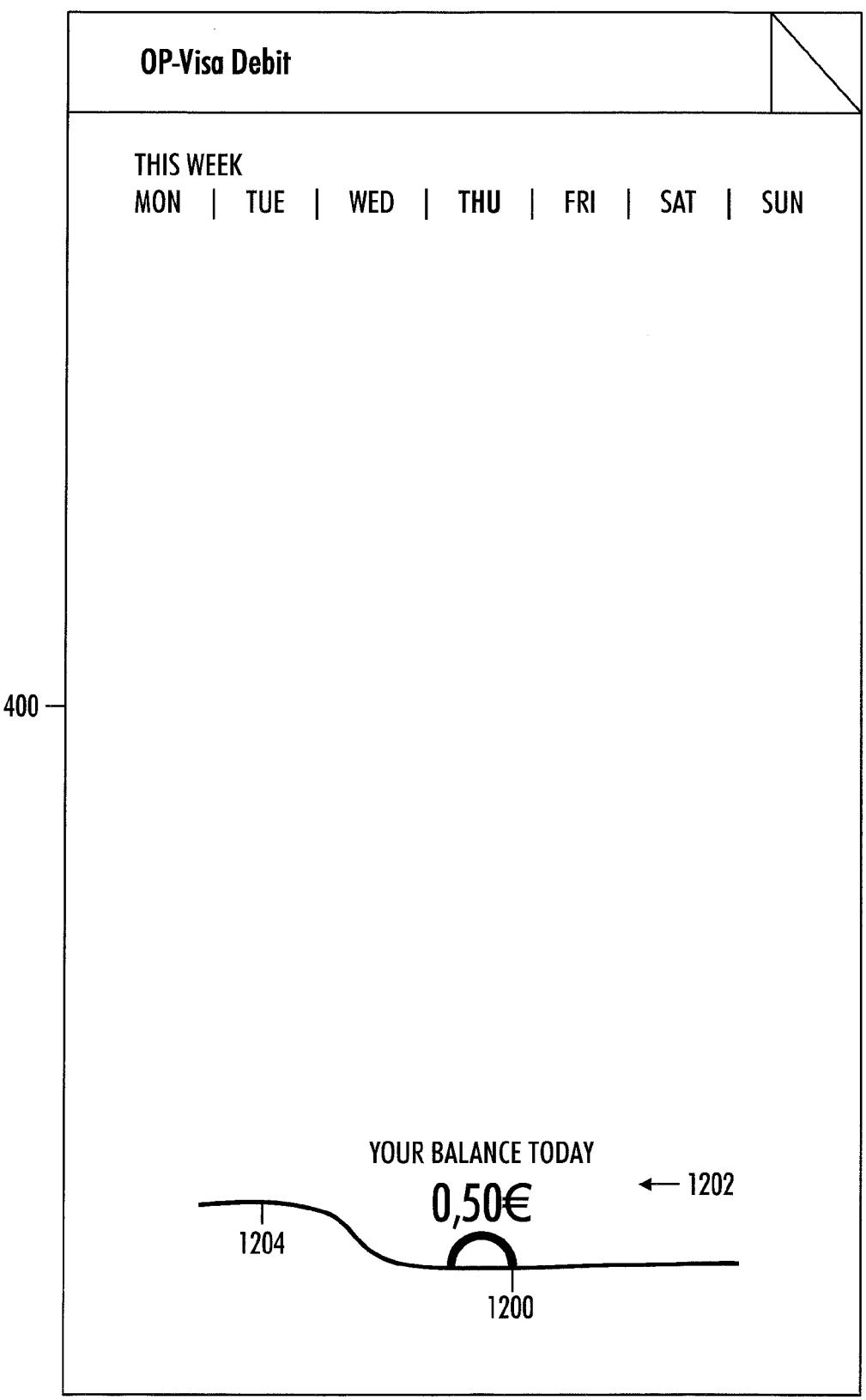
Figure 13:
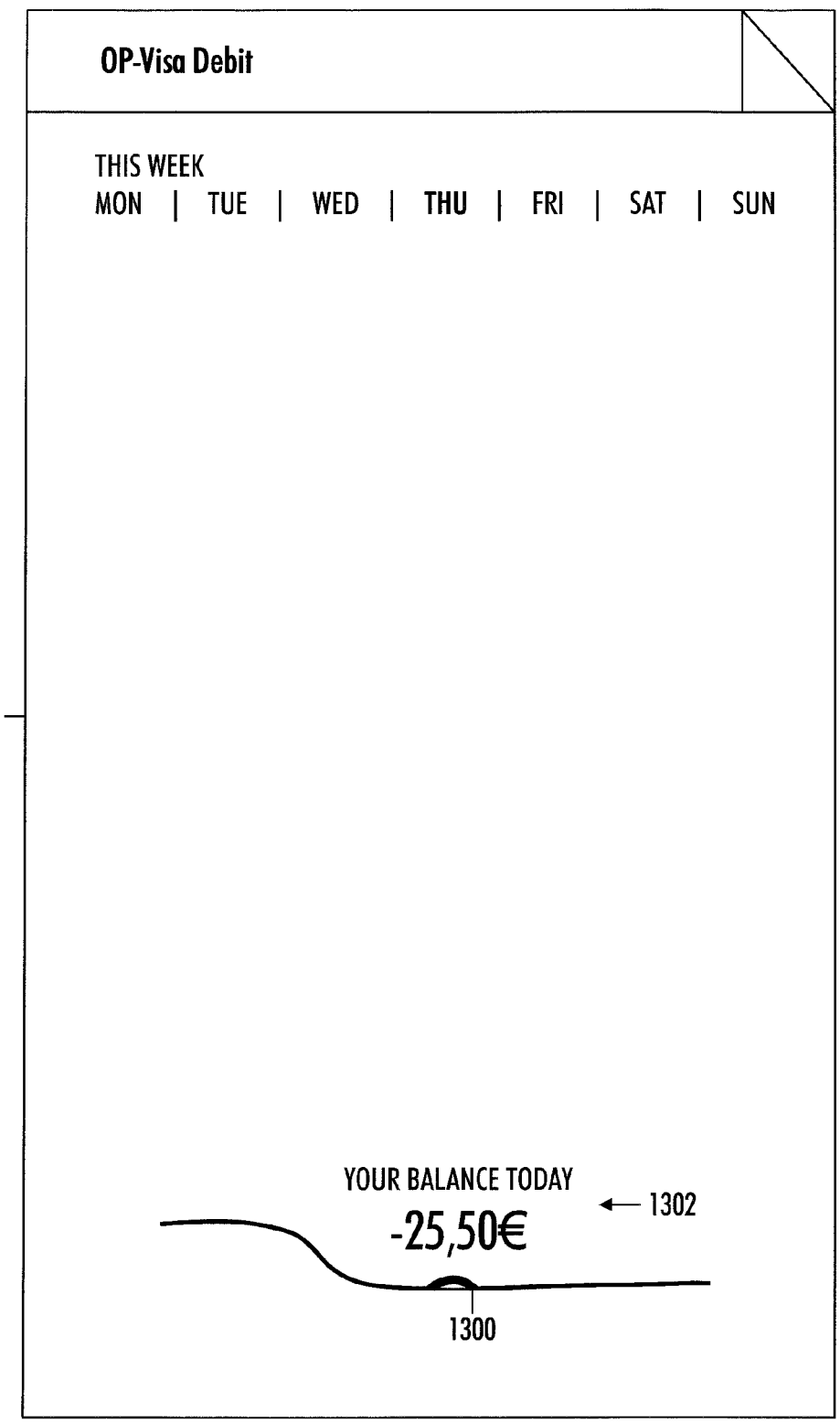

FIGS. 12 and 13 illustrate further visual effects making the display 400 even more user friendly and intuitive. If the balance 1202 of the account 134 is below a predetermined threshold (between 0 and 5 euros, for example), only half of the geometric shape 1200 may be displayed. Furthermore, a wave 1204 may be shown, which illustrates that the balance 1202 has sunk to a dangerous level. If the balance 1302 of the account 134 becomes negative, only a top part of the geometric symbol 1300 may be displayed.

Figure 10:
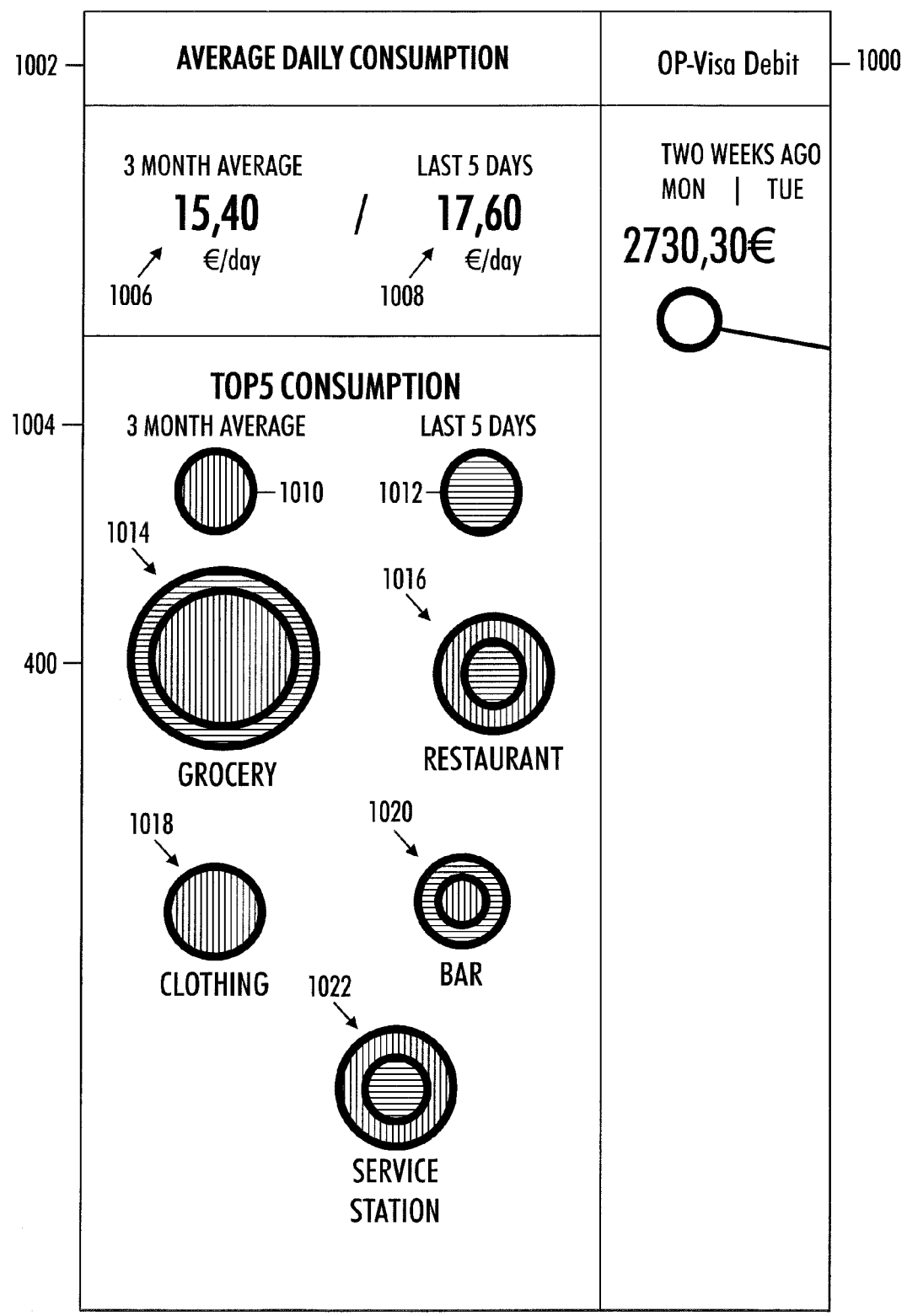

As is illustrated in FIG. 10, in an example embodiment, the one or more memories 200 and the computer program code 202 of the mobile apparatus 102 are further configured to, with the one or more processors 204, cause the mobile apparatus 102 further to transform the transaction information such that each transaction within a predetermined short effective date range (LAST 5 DAYS) is summed into a consumption type (GROCERY, RESTAURANT, CLOTHING, BAR, SERVICE STATION), calculate a short average monetary sum per day for each consumption type within the predetermined short effective date range (LAST 5 DAYS), transform the transaction information such that each transaction within a predetermined long effective date range (3 MONTH AVERAGE) is summed into a consumption type, wherein the long effective date range (3 MONTH AVERAGE) is longer than the short effective data range (LAST 5 DAYS), calculate a long average monetary sum per day for each consumption type within the predetermined long effective date range (3 MONTH AVERAGE), and display, for each summed consumption type (GROCERY, RESTAURANT, CLOTHING, BAR, SERVICE STATION), superimposed 1014, 1016, 1018, 1020, 1022 on top of each other, both the short average monetary sum 1012 and the long average monetary sum 1010, such that the surface area or the volume of the geometrical object (circles in the example embodiment of FIG. 10) represents the monetary magnitude of each summed consumption type. With this kind of presentation, it is easy to see that the consumption is, from the biggest to the smallest: grocery, service station, restaurant, clothing, and bar. It is also easy to see that during the last five days, the daily consumption for the grocery and bar has exceeded the three month average daily consumption, whereas for the restaurant and service station the daily consumption has diminished, and for the clothing nothing has been spend during the last five days. The titles 1002, 1004 denote the names of the layers/views: "Average Daily Consumption" and "Top5 Consumption". Furthermore, a part of the layer/view 1000 illustrated in FIG. 7 is visible on the display 400, as the layers/views 1002, 1004 are reached by swiping the display 400 past the layer/view 1000.

FIG. 10 further illustrates an example embodiment, wherein the one or more memories 200 and the computer program code 202 of the mobile apparatus 102 are further configured to, with the one or more processors 204, cause the mobile apparatus 102 further to detect from the transaction information daily transactions relating either to cash withdrawals with the payment card 104 or to payments with the payment card 104, calculate a short average daily consumption per day by dividing the monetary sum of daily transactions within a predetermined short daily effective date range with the number of days in the predetermined short daily effective date range, calculate a long average daily consumption per day by dividing the monetary sum of daily transactions within a predetermined long daily effective date range with the number of days in the predetermined long daily effective date range, wherein the long effective date range is longer than the short effective data range, and display both the short average daily consumption 1008 and the long average daily consumption 1006. In the detection of the daily transactions relating to cash withdrawals or payment with the payment card 104 further conditions may be applied: daily transactions may need to be regular (more than once a month, and/or relating to a specific consumption type or shop, for example), daily transactions may need to remain within certain limits (less than a certain percentage such as 15% of the monthly salary, for example).

Figure 14:
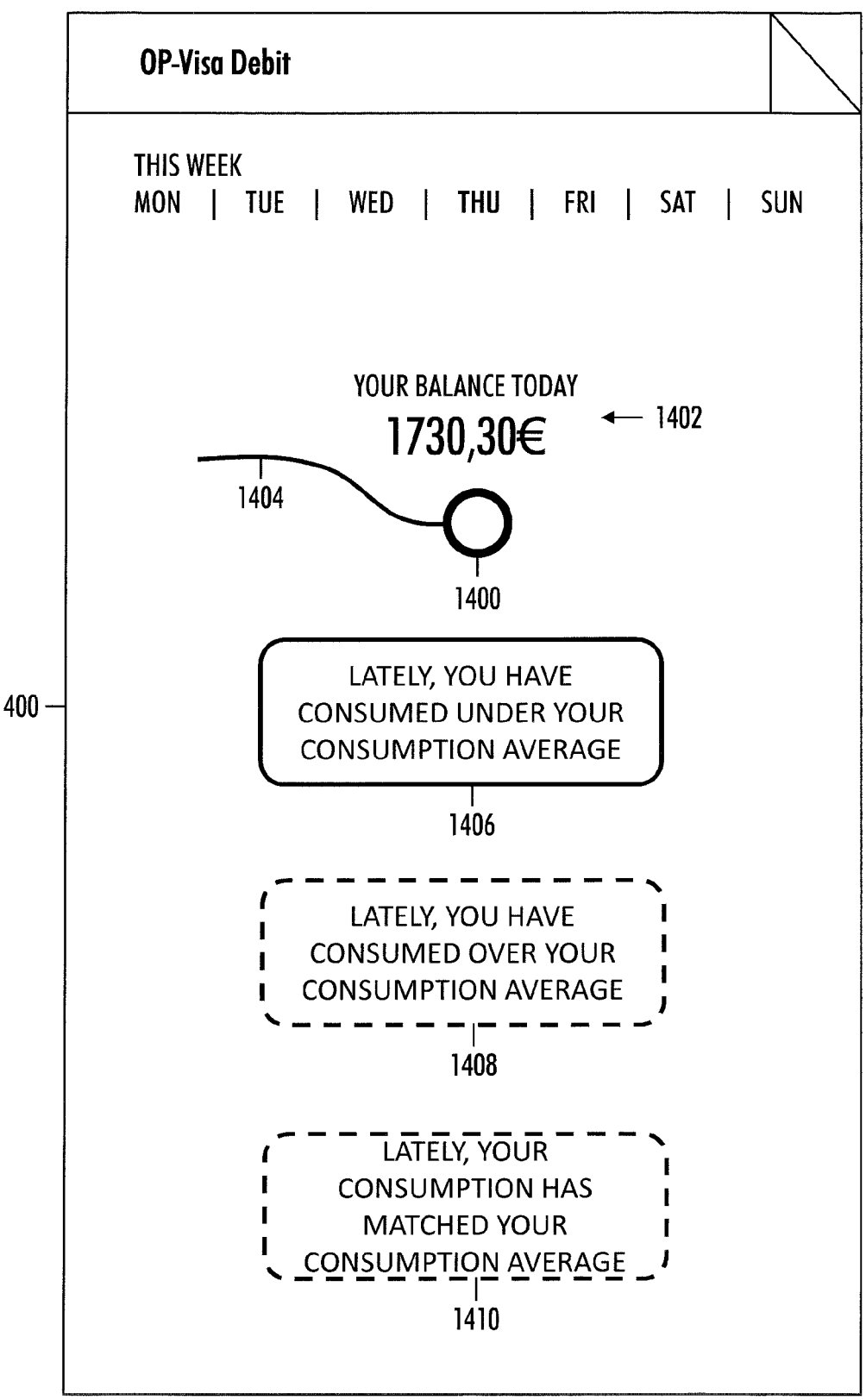

FIG. 14 illustrates another example embodiment, making use of the same calculations that produced the short average daily consumption 1008 and the long average daily consumption 1006. Namely, a "pulse" may be shown the user, when the user starts up the application in the mobile apparatus 102, for example. As shown in FIG. 14, a geometric object 1400 illustrates the present balance 1402, with or without the earlier described wave 1404 symbol. In this case, as the balance 1400 is healthy, the wave 1404 is not over the geometric object 1400. The pulse 1406 illustrates the pulse of the daily consumption habits for the user: the short average daily consumption is under the long average daily consumption. FIG. 14 also illustrates the two other optional alternatives for the pulse: in pulse 1408 the short average daily consumption is over the long average daily consumption, and in pulse 1410 the short average daily consumption matches (within certain limits such as +−5 percentage of the long average daily consumption, or within other predetermined percentage or monetary sum) the long average daily consumption). Within this example embodiment, as well as within the other example embodiments, the averages may be calculated as any parameter representing a measure of the "middle" or "typical" value of a data set. One example of such an average is an arithmetic mean. Another example is a sliding average mean. The described pulse improves the efficiency of the user interface 206 of the mobile apparatus 102 as complex balance figures and their interrelations are made understandable at a glance.

Figure 11:
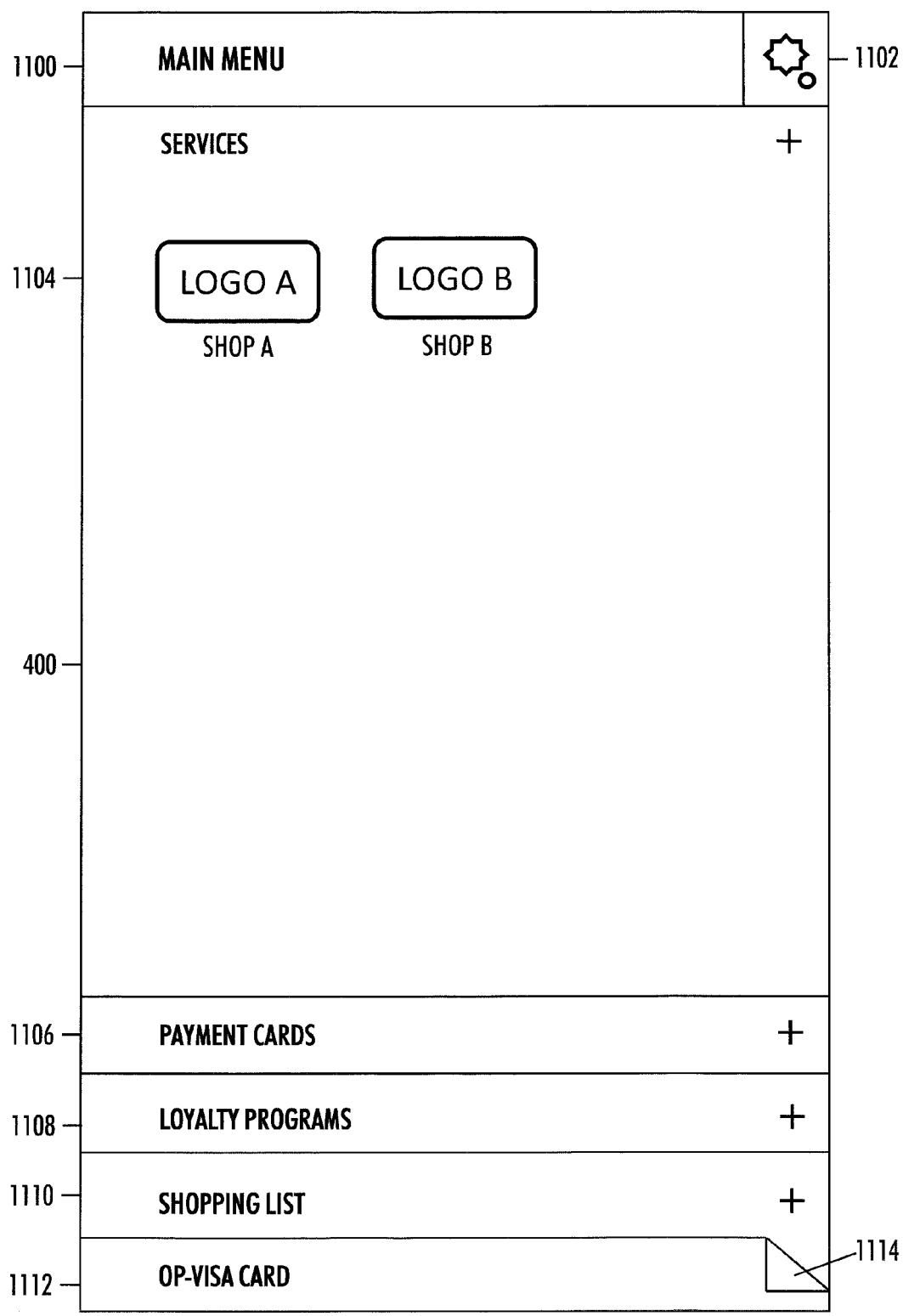

FIGS. 5 and 11 illustrate a further example embodiment, wherein the one or more memories 200 and the computer program code 202 of the mobile apparatus 102 are configured to, with the one or more processors 204, cause the mobile apparatus 102 to display, with the user interface 400, at least two layers (=balance view of FIG. 5 and main view of FIG. 10) of service on top of each other, and on the topmost layer depict a fold 502 in a corner of a window, receive, with the user interface 400, a user manipulation of the fold 502, and control the display of the layers such that after receipt of the user manipulation of the fold 502 change the display to a previous layer. In our example embodiment of FIGS. 5 and 11 this may be implemented such that the user has navigated into the OP-Visa debit screen 500 displayed in FIG. 5. Next, the user taps the fold 502 whereupon the main menu 1100 displayed in FIG. 11 is entered. As illustrated in FIG. 11, the main menu 1100 may comprise a number of further elements: a settings icon 1102, a services window 1104, a payment cards window 1106, a loyalty programs window 1108, a shopping list window 1110, and an OP-Visa card window 1112. The sub-window 1112 may also comprise a fold 1114: if the fold 1114 is pressed, another menu relating to that window 1112 may be entered. The fold 502 may implement "Back" and "Menu" into a single user interface element: each tap of the fold 502 navigates to a previous layer, and, ultimately, to the main menu. It is to be noted that this embodiment with the fold 520 may also operate in a stand-alone fashion, i.e. independently of the any of other example embodiments discussed earlier.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile apparatus, comprising:
   a wireless transceiver;
   a user interface including a display device;
   one or more processors; and
   one or more memories including computer program code, the one or more memories and the computer program code configured to, with the one or more processors, cause the mobile apparatus at least to:
   receive, from an electronic service, with the wireless transceiver, a plurality of packets relating to transactions of an account linked with a payment card, and
   transform the received plurality of packets into transaction information including information related to daily balances,
   display, via the display device of the user interface, the transaction information such that transactions in relation to each other are represented by geometric objects,
   display, via the display device, the daily balances in relation to each other such that each daily balance is depicted by a geometric shape at an effective date on a horizontal timeline and at a monetary sum on a vertical account balance line, and
   display, via the display device, the daily balances in relation to each other such that each geometric shape is coupled to the adjacent geometric shapes with geometric curves, and
   detect a tapping action upon the display device at a location on the display device corresponding to display of the daily balance or the geometric shape depicting the daily balance, and upon detection of the tapping action, causing transactions of the account affecting the tapped daily balance to be displayed by the display device,
   wherein the display of the transaction information implements user interaction such that daily balances of the account are displayed by the display device for a predetermined time period, and such that, upon a rightward swiping motion being detected upon the display device, the mobile device is caused to display a previous time period, and upon a leftward swiping motion being detected upon a next time period, and
   wherein the one or more memories and the computer program code are further configured to, with the one or more processors, cause the mobile apparatus further to:
   determine, from the transaction information, daily transactions relating either to cash withdrawals with the payment card or to payments with the payment card,
   calculate an average daily consumption per day by dividing the monetary sum of daily transactions within a predetermined daily effective date range with the number of days in the predetermined daily effective date range,
   display a linear forecast for future balance changes of the account by projecting a manner by which the average daily consumption causes changes to the monetary sums on the vertical account balance line in a predetermined future time range on the horizontal timeline,
   detect, from the transaction information, future account transactions within the predetermined future time range, and
   project the effect of the average daily consumption into the monetary sums on the vertical account balance line in the predetermined future time range on the horizontal timeline such that the future account transactions are included as input for calculating the daily balances of the account.

2. The mobile apparatus of claim 1, wherein the one or more memories and the computer program code are further configured to, with the one or more processors, cause the mobile apparatus further to:
   scale the vertical account balance line such that the vertical account balance line ranges from a zero level to a payday level.

3. The mobile apparatus of claim 1, wherein the one or more memories and the computer program code are further configured to, with the one or more processors, cause the mobile apparatus further to:
   scale the horizontal timeline such that the range is the current week, plus a predetermined number of weeks into the past, plus another predetermined number of weeks into the future.

4. The mobile apparatus of claim 1, wherein the one or more memories and the computer program code are further configured to, with the one or more processors, cause the mobile apparatus further to:
   display the transactions represented by the geometric objects such that each transaction is represented by a two-dimensional circle or a three-dimensional sphere, and each circle or sphere is coupled to the adjacent circles or spheres with ascending, descending, or horizontal lines.

5. The mobile apparatus of claim 1, wherein the one or more memories and the computer program code are further configured to, with the one or more processors, cause the mobile apparatus further to:
   display, with the user interface, at least two layers of service on top of each other, and on the topmost layer depict a fold in a corner of a window;
   receive, with the user interface, a user manipulation of the fold; and
   control the display of the layers such that after receipt of the user manipulation of the fold change the display to a previous layer.

6. A non-transitory computer-readable medium comprising computer program code that, upon execution by a processor device of a mobile apparatus, causes the mobile apparatus to:
   receive, from an electronic service, with a wireless transceiver, a plurality of packets relating to transactions of an account linked with a payment card;
   transform the received plurality of packets into transaction information including information related to daily balances;
   display, via a user interface including a display device, the transaction information such that transactions in relation to each other are represented by geometric objects;
   display, via the display device, the daily balances in relation to each other such that each daily balance is depicted by a geometric shape at an effective date on a horizontal timeline and at a monetary sum on a vertical account balance line;
   display, via the display device, the daily balances in relation to each other such that each geometric shape is coupled to the adjacent geometric shapes with geometric curves; and
   detect a tapping action upon the display device at a location on the display device corresponding to display of the daily balance or the geometric shape depicting the daily balance, and upon detection of the tapping action, causing transactions of the account affecting the tapped daily balance to be displayed by the display device, the display of the transaction information implementing user interaction such that daily balances of the account are displayed by the display device for a predetermined time period, where upon a rightward swiping motion being detected upon the display device, the mobile device displays a previous time period, and where upon a leftward swiping motion being detected upon the display device, the mobile device is caused to display a next time period;

determining, from the transaction information, daily transactions relating either to cash withdrawals with the payment card or to payments with the payment card, calculating an average daily consumption per day by dividing the monetary sum of daily transactions within a predetermined daily effective date range with the number of days in the predetermined daily effective date range, displaying a linear forecast for future balance changes of the account by projecting a manner by which the average daily consumption causes changes to the monetary sums on the vertical account balance line in a predetermined future time range on the horizontal timeline, detecting, from the transaction information, future account transactions within the predetermined future time range, and projecting the effect of the average daily consumption into the monetary sums on the vertical account balance line in the predetermined future time range on the horizontal timeline such that the future account transactions are included as input for calculating the daily balances of the account.

* * * * *